(12) United States Patent
Wang (10) Patent No.: US 8,206,135 B2
(45) Date of Patent: Jun. 26, 2012

(54) VALVE-TYPE OIL FEEDER

(75) Inventor: Dongsheng Wang, Beijing (CN)

(73) Assignee: Beijing CMRC Science & Technology Development Co., Ltd., Beijing (CN)

( * ) Notice: Subject to any disclaimer, the term of this patent is extended or adjusted under 35 U.S.C. 154(b) by 440 days.

(21) Appl. No.: 12/308,360

(22) PCT Filed: Jun. 12, 2007

(86) PCT No.: PCT/CN2007/070105
§ 371 (c)(1),
(2), (4) Date: Apr. 9, 2009

(87) PCT Pub. No.: WO2007/147356
PCT Pub. Date: Dec. 27, 2007

(65) Prior Publication Data
US 2010/0282542 A1    Nov. 11, 2010

(30) Foreign Application Priority Data
Jun. 15, 2006  (CN) .......................... 2006 1 0017955

(51) Int. Cl.
*F04B 37/00* (2006.01)
(52) U.S. Cl. ..................... 417/466; 184/7.4; 184/55.1
(58) Field of Classification Search .............. 417/460, 417/466, 13, 366; 184/7.4, 24, 26, 27.1, 184/29, 39, 42
See application file for complete search history.

(56) References Cited

U.S. PATENT DOCUMENTS 3,855,798 A * 12/1974 Spairani ........................ 60/585
4,074,699 A *  2/1978 Stampfli ................... 137/625.64
(Continued)

FOREIGN PATENT DOCUMENTS
BE              547448 A    5/1956
(Continued)

OTHER PUBLICATIONS
Extended European Search Report for EP Counterpart Patent Application No. 07721726.3-1263, 3 pgs. (Jun. 8.2009).
(Continued)

*Primary Examiner* — Peter Macchiarolo
(74) *Attorney, Agent, or Firm* — Blakely, Sokoloff, Taylor & Zafman LLP (57) ABSTRACT

A valve-type oil feeder comprising a housing, a valving spindle, and a piston. The housing has a valve chamber and a piston chamber, the valve chamber has an oil inlet, a first outlet, and a second outlet; the piston chamber has an oil intake chamber, an oil discharge chamber, and an oil outlet; the oil intake chamber communicates with the second outlet, and the oil discharge chamber communicates with the first outlet and the oil outlet respectively; the valving spindle is arranged in the valve chamber and movable between an original position at which the oil inlet is cut off from the second outlet while the first outlet communicates with the second outlet, and a working position at which the oil inlet communicates with the second outlet while the first outlet is cut off from the second outlet The present invention is applicable to various fluid and semi-fluid media, and applicable to various pressure and viscosity ranges. By controlling the operation of the valving spindle, lubricant can be supplied conveniently as necessary, and the delivery quantity of lubricant can be adjusted easily; moreover, the valve-type oil feeder is characterized in simple structure, wide application range, low production cost, and reliable operation.

11 Claims, 5 Drawing Sheets

U.S. PATENT DOCUMENTS

| | | | | |
|---|---|---|---|---|
| 4,105,094 A | * | 8/1978 | Callahan | 184/7.4 |
| 4,157,132 A | * | 6/1979 | Kramer | 184/7.4 |
| 4,617,961 A | * | 10/1986 | Lichtenberg | 137/596.16 |
| 5,746,413 A | * | 5/1998 | Goloff | 417/466 |
| 6,170,508 B1 | * | 1/2001 | Faust et al. | 137/12 |

FOREIGN PATENT DOCUMENTS

| | | |
|---|---|---|
| CN | 87 2 12235 U | 9/1988 |
| CN | 87212235 U | 9/1988 |
| CN | 2683989 Y | 3/2005 |
| CN | 101109478 A | 1/2008 |
| DE | 3 605 775 C | 7/1987 |
| GB | 243367 | 5/1927 |
| GB | 842 313 A | 7/1960 |
| JP | 2002-147344 | 5/2002 |
| JP | 2004-519595 | 2/2004 |
| KR | 10-0478898 | 3/2005 |
| SU | 86728 A | 2/1960 |
| UA | 47314 A | 6/2002 |

OTHER PUBLICATIONS

Office Action for Korean Counterpart Application No. 10-2009-7000128 including English translation, 5 pgs. (Mar. 9, 2011).

International Search Report for PCT/CN2007/070105, 4 pgs. (Sep. 6, 2007).

* cited by examiner

VALVE-TYPE OIL FEEDER

CROSS REFERENCE TO RELATED APPLICATIONS:

This patent application is a National Phase application under 35 U.S.C. §371 of International Application No. PCT/CN2007/070105, filed on 12 Jun. 2007, entitled A VALVE-TYPE OIL FEEDER, which claims priority to Chinese patent application number 200610017955.3, filed 15 Jun. 2006.

FIELD OF THE INVENTION

The present invention relates to an oil feeder, in particular to a valve-type oil feeder which is designed to feed lubricant oil or grease.

BACKGROUND OF THE INVENTION

In a lubrication system, it is very important for normal transport and feeding of lubricant oil or grease, especially for key parts of large-size equipments.

In order to ensure accurate and normal feeding of lubricant oil or grease, centralized lubrication systems are usually used today. Presently, commonly used centralized lubrication methods include single line, dual line, and oil-gas types, etc., the main components of which are single line type oil feeder, duel line type oil feeder, and progressive type oil feeder, etc.

However, in actual applications, for no matter single line type oil feeder, duel line type oil feeder, or progressive type oil feeder, random control is not available, and in the design process it is required to calculate accurately the quantity of oil or grease used at each point of the system, and the quantity hardly can be adjusted in actual use, and the lubrication interval at each point of the system must be identical. Single line type oil feeders also have a drawback of narrow application range, i.e. which are only applicable to fluids with low viscosity and good fluidity, but can't feed fluid or semi-liquid media with high viscosity or poor fluidity normally; duel line type oil feeders and progressive type oil feeders are complex in structure and require high machining accuracy, and have high failure rate in application; double line type oil feeders must use two main pipelines to feed lubricant oil in alternate and in parallel, and therefore the pipeline structure is complex; as for progressive type oil feeders, once any failure occurs in the application, it will be unable to determine accurately the location of the failure point, and therefore the repair work will be very difficult.

SUMMARY OF THE INVENTION

The object of the present invention is to provide a novel valve-type oil feeder for feeding lubricant oil or grease, which has simple structure, wide application range, low production cost, and can operate reliably.

To achieve the above object, the present invention provides a valve-type oil feeder, which comprises a housing, a valving spindle and a piston, wherein: the housing has a valve chamber and a piston chamber; the valve chamber has an oil inlet, a first outlet and a second outlet; the piston chamber has an oil intake chamber, an oil discharge chamber and an oil outlet, the oil intake chamber communicates with the second outlet, and the oil discharge chamber communicates with the first outlet and the oil outlet respectively; the valving spindle is arranged in the valve chamber and movable, for example, slidable axially or rotatable around its axis, between an original position at which the oil inlet is cut off and the first outlet communicates with the second outlet, and a working position at which the first outlet is cut off and the oil inlet communicates with the second outlet; the piston is arranged in the piston chamber and axially slidable under the action of a returning element and the oil pressure.

When lubricant oil or grease is to be fed to a working point, the valving spindle will be moved to the working position by manual or automatic drive unit, such as an electric-driving, hydraulic-driving, pneumatic-driving, or electromagnetic-driving drive unit, i.e., the oil inlet is opened, while the first outlet is cut off. Therefore, the lubricant oil or grease can flow from the oil inlet through the second outlet into the oil intake chamber of the piston chamber, to push the piston to move upwards against the spring force of the returning element, and thereby supply the lubricant oil or grease in the oil discharge chamber through the oil outlet to the required point.

When the lubricant oil or grease feeding is to be stopped, the manual or automatic drive unit can be operated in reverse direction (or a valving spindle returning element can be used) to return the valving spindle to the original position, i.e., the oil inlet is cut off, while the first outlet communicates with the second outlet. At this time, under the spring force of the piston returning element, the piston will move downwards, the lubricant oil or grease in the oil discharge chamber will not flow out through the oil outlet due to the loss of pressure, and the lubricant oil or grease in the oil intake chamber will flow through the second outlet and the first outlet into the oil discharge chamber, and finally the piston is returned.

With the present valve-type oil feeder, by controlling the operation of the valving spindle, such as its working time and working cycle, etc., lubricant oil or grease can be supplied conveniently as necessary; in addition, by controlling the working frequency of the valving spindle and the capacity of the oil discharge chamber, the delivery quantity of lubricant oil or grease can be adjusted easily.

In addition, as a preferred embodiment, a piston position sensor can be provided for the piston in the valve-type oil feeder in the present invention, so as to detect the piston position. Specifically, when the valving spindle is at the working position, the piston position sensor can judge whether the lubricant oil or grease is fed normally or not, or whether the valve-type oil feeder has failures or malfunctions or not by detecting the piston position, and send the information to a remote monitoring system, so that the personnel can obtain the lubricant feeding information on the site in a control room far away from the site, and does not need to go to the site to observe and check; the valve-type oil feeder not only can improve detection accuracy, improve working condition, reduce labor intensity, and enhance safety, but also has the advantages in simple structure, wide application range, and low manufacturing cost, and can achieve central control and unified management of lubricant oil or grease feeding work, and therefore has high application value.

DETAILED DESCRIPTION OF THE EMBODIMENTS

Hereunder the present invention will be detailed in the embodiments, with reference to the accompanying drawings.

As shown in the drawings, the valve-oil feeder of the present invention may comprise a housing 1, a valving spindle 2, and a piston 5, wherein: the housing 1 has a valve chamber 3 and a piston chamber 4; the valve chamber 3 has an oil inlet P, a first outlet A, and a second outlet B; the piston chamber 4 has a oil intake chamber 4a, an oil discharge chamber 4b, and an oil outlet C. The oil intake chamber 4a communicates with the second outlet B, and the oil discharge chamber 4b communicates with the first outlet A and the oil outlet C respectively. The valving spindle 2 is arranged in the valve chamber 3, and can move, for example slide in axial direction or rotate around the axis, between an original position and a working position, wherein, at the original position, the oil inlet P is cut off, and the first outlet A communicates with the second outlet B; at the working position, the first outlet A is cut off, and the oil inlet P communicates with the second outlet B. The piston 5 is arranged in the piston chamber 4 and can slide axially under the action of a returning element 6 and the oil pressure.

When lubricant oil or grease is to be fed to the working point, the valving spindle 2 will be moved to the working position by a manual or automatic drive unit such as an electric, hydraulic, pneumatic, or electromagnetic drive unit, i.e., the oil inlet P is opened, while the first outlet A is cut off. Therefore, the lubricant oil or grease will flow from the oil inlet P through the second outlet B into the oil intake chamber 4a of the piston chamber 4, to push the piston 5 upwards against the spring force of the returning element 6, and thereby supply the lubricant oil or grease in the oil discharge chamber 4b through the oil outlet C to the required position.

When the lubricant oil or grease feeding is to be stopped, the valving spindle 2 can be returned to the original position by means of the operation in reverse direction of the manual or automatic drive unit, or by means of a valving spindle returning element such as a compression spring or driving gas, i.e., the oil inlet P is cut off, while the first outlet A communicates with the second outlet B. At the same time, under the spring force of the piston returning element 6, the piston 5 will move downwards, the lubricant oil or grease in the oil discharge chamber 4b will not flow out of the oil outlet C due to the loss of pressure, and the lubricant oil or grease in the oil intake chamber 4a will flow through the second outlet B and the first outlet A into the oil discharge chamber 4b, and finally the piston 5 is returned.

Hereunder the valve-type oil feeder provided in the present invention will be detailed in some embodiments.

Embodiment 1

Figure 1:
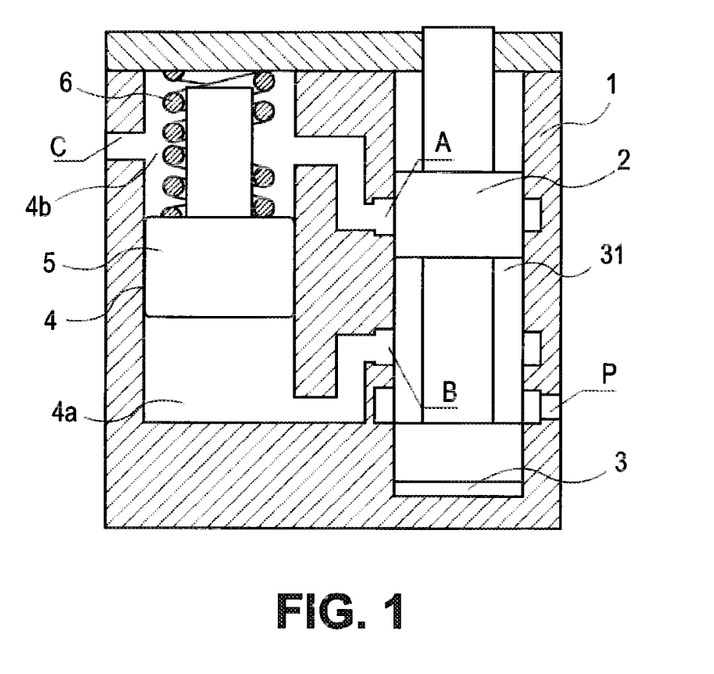
FIG. 1 is a structural schematic view of the valve-type oil feeder in working state in accordance with the first embodiment of the present invention.
Figure 2:
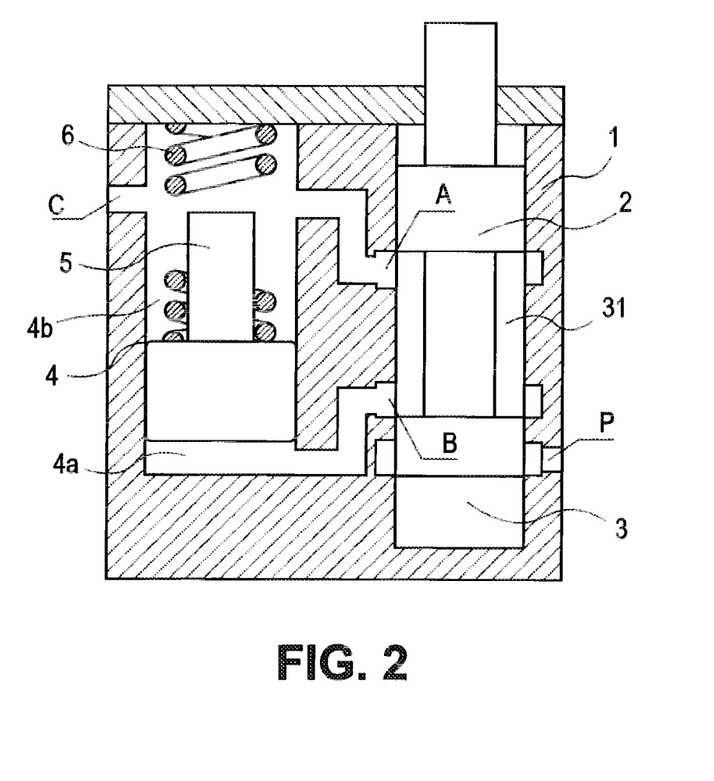
FIG. 2 is a structural schematic view of the valve-type oil feeder in original state in accordance with the first embodiment of the present invention.

FIG. 1 is a structural schematic view of the valve-type oil feeder in working state in accordance with the first embodiment of the present invention. FIG. 2 is a structural schematic view of the valve-type oil feeder in original state in accordance with the first embodiment of the present invention.

As shown in FIG. 1 and FIG. 2, the valve-type oil feeder in accordance with the first embodiment of the present invention mainly comprises a housing 1, a valving spindle 2, and a piston 5.

The housing 1 has a valve chamber 3 designed to accommodate the valving spindle 2, and a piston chamber 4 designed to accommodate the piston 5. The valve chamber 3 has an oil inlet P, a first outlet A, and a second outlet B. In addition, the valve chamber 3 further has an oil storage chamber 31. The piston chamber 4 has an oil intake chamber 4a, an oil discharge chamber 4b, and an oil outlet C. The oil intake chamber 4a communicates with the second outlet B, and the oil discharge chamber 4b communicates with the first outlet A and the oil outlet C respectively, i.e., the oil discharge chamber 4b communicates with the first outlet A at one side, and communicates with the oil outlet C at the other side.

The valving spindle 2 is arranged in the valve chamber 3, and can slide axially between an original position and a working position. The valve chamber 3 and the valving spindle 2 in the valve chamber 3 are formed integrally into a structure similar to a two-position three-way directional control valve. The piston 5 is arranged in the piston chamber 4 and can slide axially under the action of the returning element 6 and the oil pressure, and its position mainly depends on the position of the valving spindle 2 in the valve chamber 3.

Specifically, as shown in FIG. 1, the valving spindle 2 is at the working position, i.e., the valve-type oil feeder is in working state. Here, the oil inlet P and the second outlet B are at the position of the oil storage chamber 31, the first outlet A is moved out of the position of the oil storage chamber 31, and therefore the oil inlet P communicates with the second outlet B through the oil storage chamber 31, whereas the first outlet A is cut off by the external surface of the valving spindle 2. When lubricant oil is inputted through the oil inlet P, the lubricant oil will enter into the oil intake chamber 4a of the piston chamber 4 through the oil storage chamber 31 and the second outlet B, and push the piston 5 to move upwards against the spring force of the returning element 6 such as a returning spring, and thereby the lubricant oil in the oil discharge chamber 4b is fed through the oil outlet C to the required position.

When the lubricant feeding operation is to be stopped, firstly the valving spindle 2 in the valve chamber 3 will be reset or returned by a drive unit or a returning element, i.e., the valving spindle 2 will be moved from the position shown in FIG. 1 to the position shown in FIG. 2. At the same time, as shown in FIG. 2, the oil inlet P will be moved out of the position of the oil storage chamber 31, and the first outlet A will communicate with the second outlet B through the oil storage chamber 31. Therefore, the piston 5 in the piston chamber 4 will be reset or returned under the spring force of the returning element 6 such as a returning spring, i.e., the piston 5 will be moved downwards from the position shown in FIG. 1 to the position shown in FIG. 2. At the same time, in this process, the lubricant oil in the oil intake chamber 4a will flow through the second outlet B and the first outlet A into the oil discharge chamber 4b, and therefore the piston 5 can be returned successfully.

In the present invention, the valving spindle 2 can be driven by manual, electric, hydraulic, pneumatic, or electromagnetic means to move between the working position and the original position; there is no limitation on the driving method in the present invention. However, as a preferred embodiment, the movement of the valving spindle 2 can be controlled by an electromagnetic drive unit, which is beneficial for automatic control of the valve-type oil feeder in the present invention.

As described above, the valving spindle 2 can be moved from the working position shown in FIG. 1 to the original position shown in FIG. 2 by means of reverse operation of the drive unit or manually. As an alternative, a valving spindle returning element can be provided for the valving spindle 2; for example, a compression spring (now shown) can be arranged below the valving spindle 2, or compressed air can be supplied to the cavity below the valving spindle 2, so as to return the valving spindle 2.

As a preferred embodiment, a piston position sensor (not shown) can be provided for the piston 5; the piston position sensor can be arranged on the piston 5 or the housing 1, to detect the position or position change of the piston 5.

Specifically, when the valving spindle 2 is at the working position, the piston position sensor can judge whether the lubricant oil or grease is fed normally or not or whether the valve-type oil feeder provided in the present invention has failures or not by detecting the position of the piston 5, and send the information to a remote monitoring system, so that the personnel can obtain the lubricant oil or grease feeding information on the site in a control room far away from the site, and needn't to go to the site to observe and check; the valve-type oil feeder not only can improve detection accuracy, improve working condition, reduce labor intensity, and enhance safety, but also is characterized in simple structure, wide application range, and low manufacturing cost, and can achieve central control and unified management of lubricant oil or grease feeding work, and therefore has high application value.

The piston position sensor can be any sensor that can detect position change of valve piston in the prior art, such as a Hall sensor or proximity switch, etc. For example, a Hall switch model HA2M14 produced by Shanghai Runan Industrial Sensors Co., Ltd. can be used. The piston position sensor can send piston position signals outside (e.g., an external monitor device) with any known technique, such as electromagnetic wave or cable, etc.

In addition, a lubricant delivery amount regulating device can be provided for the valve-type oil feeder in the present invention, so as to supply lubricant oil or grease accurately and quantitatively. The delivery amount regulating device can be any appropriate structure in the prior art; for example, the position of the piston 3 in the piston chamber 4 can be set simply with a positioning mechanism, or an adjusting screw fitted to the housing 1 can be arranged on the piston 3, so as to control the stroke of the piston 3 in the piston chamber 3, etc.

In addition, a control system can be provided for the present invention; the control system can receive and process position information of the piston 3 detected by the piston position sensor, support the operator to input working parameters of the valving spindle 2 and control the working state of the valving spindle 2 according to the parameters, and display the position information of the piston 3 and the working state information of the valving spindle 2 to the operator, etc.

Embodiment 2

Figure 3:
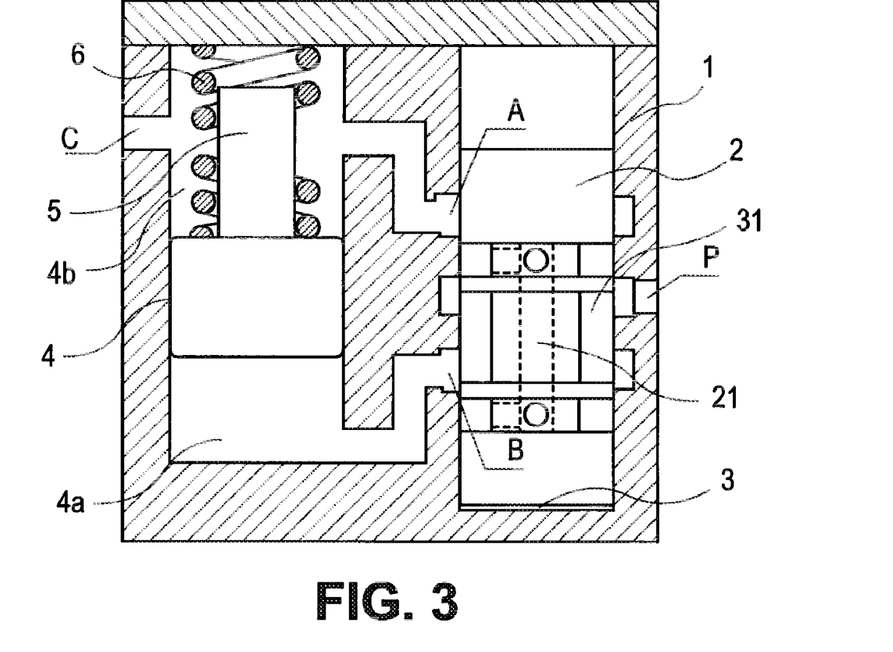
FIG. 3 is a structural schematic view of the valve-type oil feeder in working state in accordance with the second embodiment of the present invention.
Figure 4:
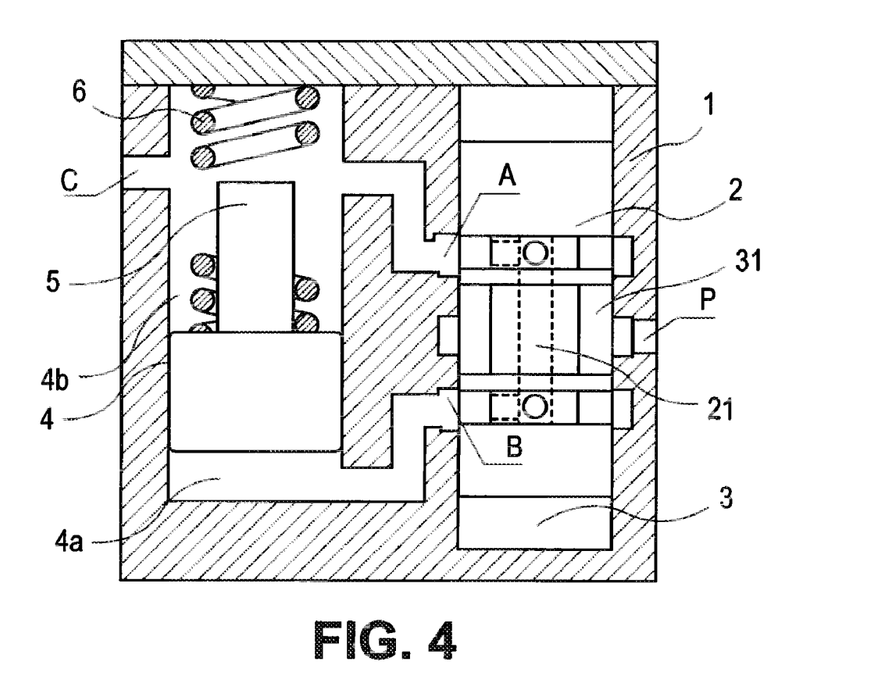
FIG. 4 is a structural schematic view of the valve-type oil feeder in original state in accordance with the second embodiment of the present invention.

FIG. 3 is a structural schematic view of the valve-type oil feeder in working state in accordance with the second embodiment of the present invention. FIG. 4 is a structural schematic view of the valve-type oil feeder in original state in accordance with the second embodiment of the present invention.

As shown in FIG. 3 and FIG. 4, the difference between the valve-type oil feeder in the second embodiment and the valve-type oil feeder in the first embodiment of the present invention mainly lies only in the structure of the valve chamber 3 and the structure of the valving spindle 2 in the valve chamber 3. Therefore, hereunder the valve chamber 3 and the valving spindle 2 in the valve chamber 3 will be mainly described. Generally, the description about other aspects of the first embodiment is also applicable to the second embodiment essentially, and therefore will not be further detailed here. In addition, unless otherwise stated, the description about all aspects of the first embodiment is also applicable to other embodiments that will be described hereunder.

As shown in FIG. 3, the valve chamber 3 has an oil storage chamber 31, and the valving spindle 2 has a flow channel 21 therein. In view of processability, the flow channel 21 may include but is not limited to: two radial holes that are opened corresponding to the first outlet A and the second outlet B and illustrated with dotted lines; an axial hole that is connected between the two radial holes and illustrated with dotted lines; and a radial through hole that is arranged at the jointing point between the radial holes and the axial hole so that the radial holes can communicate with the axial hole. When the valving spindle 2 is at the working position, the oil inlet P communicates with the second outlet B through the oil storage chamber 31. In addition, the first outlet A and the second outlet B are staggered from the flow channel 21 and therefore don't communicate with each other. At that time, the lubricant oil flows through the oil inlet P and enters into the oil intake chamber 4a through the oil storage chamber 31 and the second outlet B, pushes the piston 5 upwards against the spring force of the spring 6, and thereby the lubricant oil in the oil discharge chamber 4b is fed through the oil outlet C to the required position.

As shown in FIG. 4, when the valving spindle 2 is reset from the working position to the original position, the oil storage chamber 31 is cut off from the second outlet B. At the same time, the first outlet A and the second outlet B are aligned towards the two ends of the flow channel 21, and thereby communicate with each other through the flow channel 21. As described above, the valve-type oil feeder can return from the working position to the original position successfully.

Embodiment 3

Figure 5:
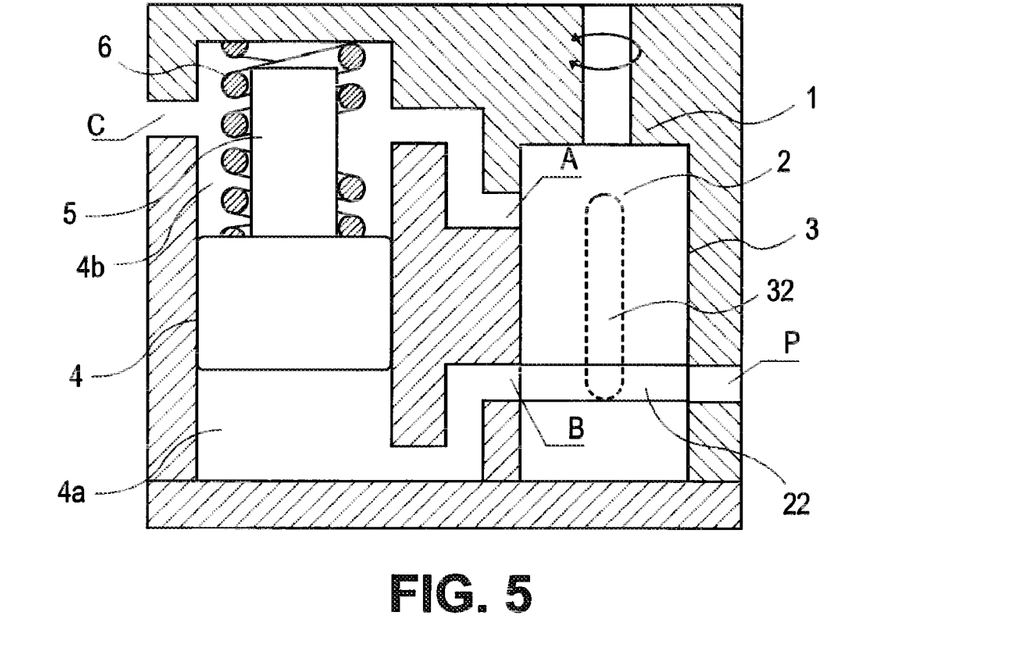
FIG. 5 is a structural schematic view of the valve-type oil feeder in working state in accordance with the third embodiment of the present invention.
Figure 6:
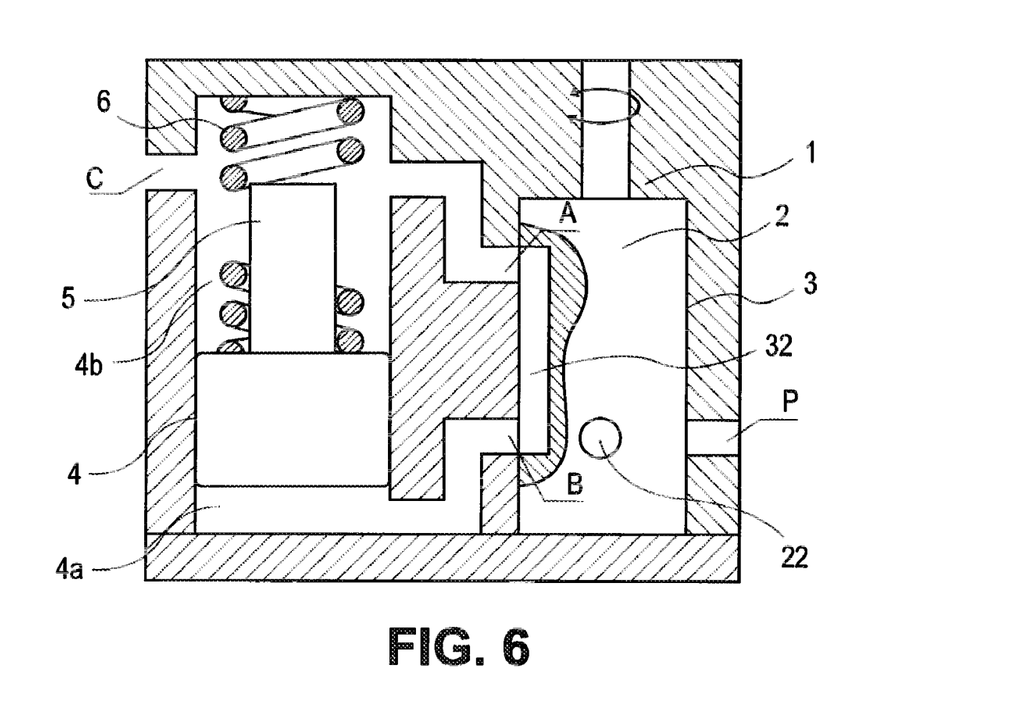
FIG. 6 is a structural schematic view of the valve-type oil feeder in original state in accordance with the third embodiment of the present invention.

FIG. 5 is a structural schematic view of the valve-type oil feeder in working state in accordance with the third embodiment of the present invention. FIG. 6 is a structural schematic view of the valve-type oil feeder in original state in accordance with the third embodiment of the present invention.

As shown in FIG. 5 and FIG. 6, the difference between the third embodiment and the first and second embodiments mainly lies in the structure of the valve chamber. In addition, it is noted that, in the third embodiment, the valving spindle 2 is arranged in the valve chamber 3 in a rotary manner.

Specifically, as shown in FIG. 5 and FIG. 6, the valving spindle 2 has a groove 32 on a side, and has a radial through hole 22 arranged therein. In addition, the groove 32 and the radial through hole 22 are arranged at a predetermined angle to each other on the circumference of the valving spindle 2, i.e., they are staggered by a predetermined angle to each other, for example, staggered by 90°.

As shown in FIG. 5, the valving spindle 2 is at the working position. Here, the oil inlet P communicates with the second outlet B through the radial through hole 22, so that the lubricant oil can flow through the oil inlet P, radial through hole 22 and second outlet B into the oil intake chamber 4a successfully, and then push the piston 5 to move upwards, so that the lubricant oil is fed through the oil outlet C.

As shown in FIG. 6, when the valving spindle 2 moves from the working position towards the original position, the valving spindle 2 rotates by a certain angle around its axis in the valve chamber 3, so that the groove 32 on the side of the valving spindle 2 moves to the position of the first outlet A and the position of the second outlet B respectively, so that the two outlets A and B will communicate with each other. Since the groove 32 is staggered from the radial through hole 22, the communication among the radial through hole 22, the oil inlet P and the second outlet B is cut off. In that way, as described above, the valve-type oil feeder can return to the original position successfully.

Embodiment 4

Figure 7:
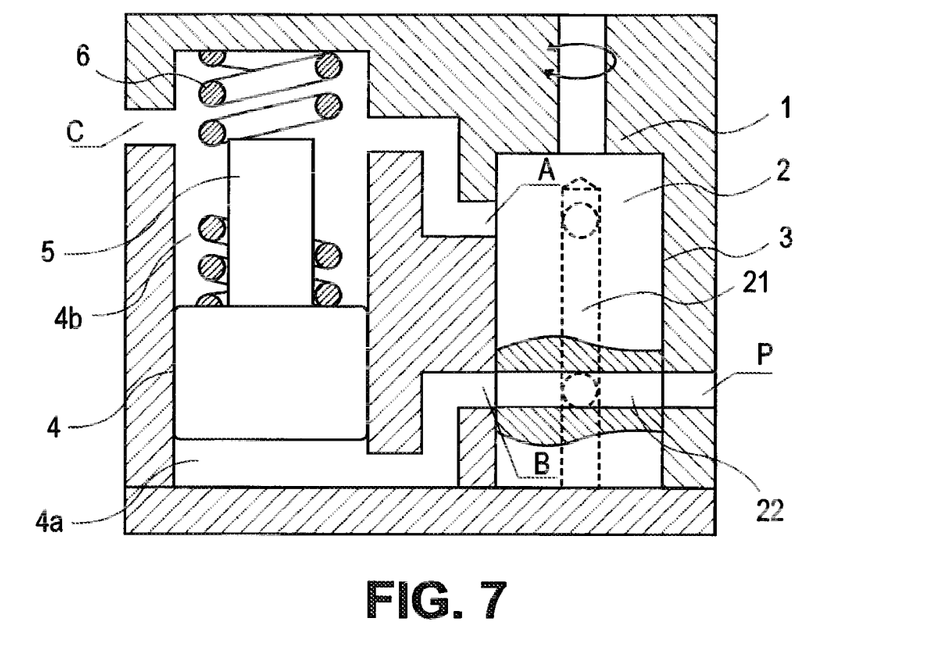
FIG. 7 is a structural schematic view of the valve-type oil feeder in working state in accordance with the fourth embodiment of the present invention.
Figure 8:
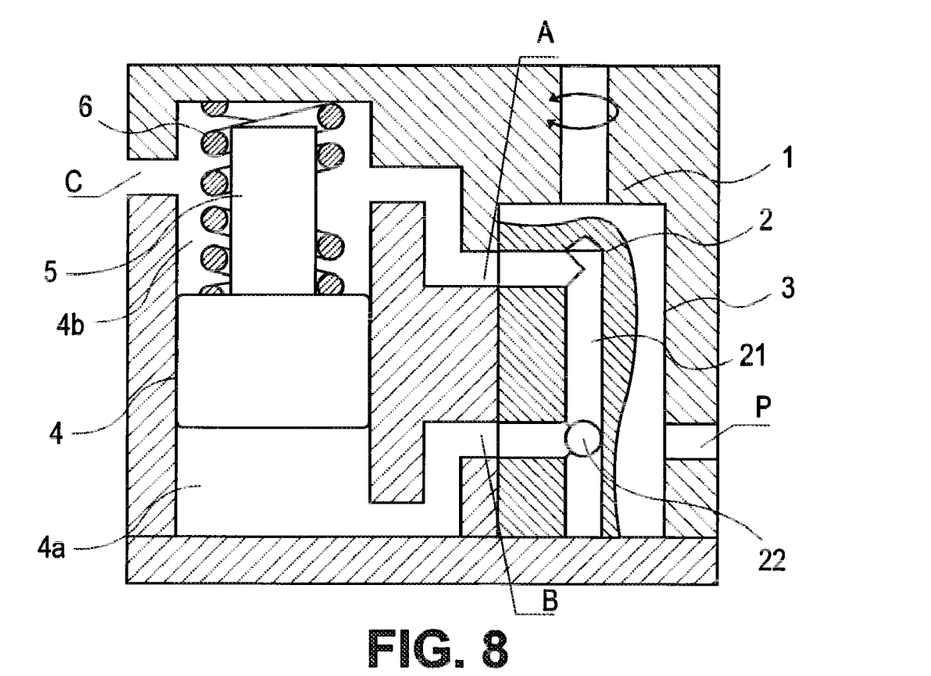
FIG. 8 is a structural schematic view of the valve-type oil feeder in original state in accordance with the fourth embodiment of the present invention.

FIG. 7 is a structural schematic view of the valve-type oil feeder in working state in accordance with the fourth embodiment of the present invention. FIG. 8 is a structural schematic view of the valve-type oil feeder in original state in accordance with the fourth embodiment of the present invention.

As shown in FIG. 7 and FIG. 8, the difference between the fourth embodiment and the third embodiment mainly lies in that: a flow channel 21 is opened in the valving spindle 2 to substitute the groove 32 in the third embodiment.

As shown in FIG. 7, the valving spindle 2 is at the working position. Here, the oil inlet P communicates with the second outlet B through the radial through hole 22, so that the lubricant oil can flow through the oil inlet P, radial through hole 22 and second outlet B into the oil intake chamber 4a successfully, and then push the piston 5 to move upwards, so that the lubricant oil is fed through the oil outlet C.

As shown in FIG. 8, when the valving spindle 2 moves from the working position towards the original position, the valving spindle 2 rotates by a certain angle around its axis in the valve chamber 3, so that the flow channel 21 in the valving spindle 2 moves to the position facing the first outlet A and the position facing the second outlet B, so that the two outlets A and B will communicate with each other. At the same time, the communication among the radial through hole 22, the oil outlet P and the second outlet B is cut off. In that way, as described above, the valve-type oil feeder can return to the original position successfully.

Embodiment 5

Figure 9:
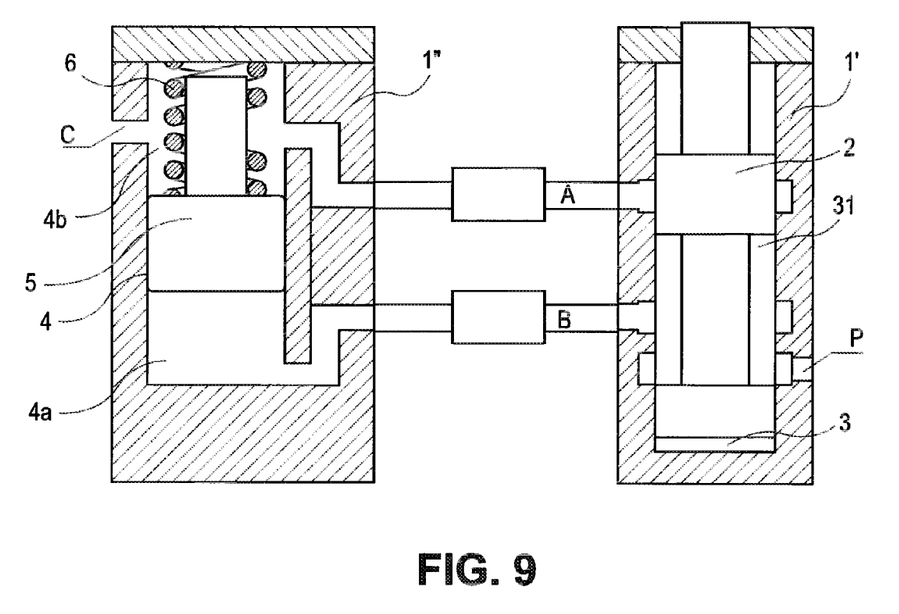
FIG. 9 is a structural schematic view of the valve-type oil feeder in accordance with an optional embodiment of the present invention.

FIG. 9 is a structural schematic view of an optional valve-type oil feeder in the present invention; compared to the valve-type oil feeder shown in FIG. 1, the difference mainly lies in that: the valve-type oil feeder comprises two separate parts, i.e., the oil feeding component on the left and the slide valve component on the right in FIG. 9.

Specifically, the housing 1 can comprise two separate valve body 1' and piston body 1". The valving spindle 2 is in the valve body 1', while the piston 5 is in the piston body 1". The oil intake chamber 4a can communicate with the second outlet B and the oil discharge chamber 4b can communicate with the first outlet A through a pipeline respectively.

In use, the oil feeding component and the slide valve component can be connected via any appropriate connecting component in the field, i.e., the first outlet A communicates with the oil discharge chamber 4b, and the second outlet B communicates with the oil intake chamber 4a. In other aspects, the valve-type oil feeder are essentially identical to the valve-type oil feeders in the embodiment, and can be applied in any of the embodiments 1-4, i.e., all the valve-type oil feeders described above can employ the structure in the fifth embodiment, to form a two-piece structure; and they are only connected through a pipeline in use.

While the present invention has been illustrated and described with reference to some preferred embodiments, the present invention is not limited to these. Those skilled in the art should recognize that various variations and modifications, for example, modification or improvement to the valving spindle structure, can be made without departing from the spirit and scope of the present invention as defined by the accompanying claims.

With the structure described above, the valve-type oil feeder provided in the present invention is applicable to lubricant and grease in different pressure and viscosity ranges.

The invention claimed is:

1. A valve-type oil feeder, comprising a housing, a valving spindle, and a piston, wherein:
   the housing has a valve chamber and a piston chamber, the valve chamber has an oil inlet, a first outlet, and a second outlet; the piston chamber has an oil intake chamber, an oil discharge chamber, and an oil outlet; the oil intake chamber communicates with the second outlet, and the oil discharge chamber communicates with the first outlet and the oil outlet respectively;
   the valving spindle is arranged in the valve chamber and movable between an original position at which the oil inlet is cut off from the second outlet while the first outlet communicates with the second outlet, and a working position at which the oil inlet communicates with the second outlet while the first outlet is cut off from the second outlet;
   the piston is arranged in the piston chamber and can slide axially under the action of a returning element and the oil pressure.

2. The valve-type oil feeder according to claim 1, wherein the valving spindle is movable between the original position and the working position by sliding axially in the valve chamber.

3. The valve-type oil feeder according to claim 1 or 2, wherein:
   the valve chamber has an oil storage chamber;
   when the valving spindle is at the original position, the first outlet communicates with the second outlet through the oil storage chamber, while the oil inlet is cut off by the external surface of the valving spindle;
   when the valving spindle is at the working position, the oil inlet communicates with the second outlet through the oil storage chamber, while the first outlet is cut off by the external surface of the valving spindle.

4. The valve-type oil feeder according to claim 1 or 2, wherein:
   the valve chamber has an oil storage chamber, and the valving spindle has a flow channel therein;
   when the valving spindle is at the original position, the first outlet communicates with the second outlet (B) through the flow channel;
   when the valving spindle is at the working position, the oil inlet communicates with the second outlet through the oil storage chamber.

5. The valve-type oil feeder according to claim 1, wherein the valving spindle is movable between the original position and the working position by rotating around its axis in the valve chamber.

6. The valve-type oil feeder according to claim 1 or 5, wherein:
- the valving spindle has a groove at a side surface thereof and a radial through hole therein, which are staggered off from each other around the circumference of the valving spindle;
- when the valving spindle is at the original position, the first outlet communicates with the second outlet through the groove;
- when the valving spindle is at the working position, the oil inlet communicates with the second outlet through the radial through hole.

7. The valve-type oil feeder according to claim 1 or 5, wherein:
- the valving spindle has a flow channel and a radial through hole therein, which are staggered off from each other around the circumference of the valving spindle;
- when the valving spindle is at the original position, the first outlet communicates with the second outlet through the flow channel;
- when the valving spindle is at the working position, the oil inlet communicates with the second outlet through the radial through hole.

8. The valve-type oil feeder according to claim 1, wherein the valving spindle is movable between the working position and the original position by means of a manual, an electric-driving, a hydraulic-driving, a pneumatic-driving, or an electromagnetic-driving means.

9. The valve-type oil feeder according to claim 1, wherein the valving spindle may be returned by a valving spindle returning element.

10. The valve-type oil feeder according to claim 1, wherein the valve-type oil feeder further comprises a piston position sensor, which is arranged on the piston or the housing to detect the position or position change of the piston.

11. The valve-type oil feeder according to claim 1, wherein:
- the housing comprise two separate valve housing and piston housing, the valving spindle is arranged in the valve housing, and the piston is arranged in the piston housing;
- the communication between the oil intake chamber and the second outlet, and communication between the oil discharge chamber and the first outlet are realized through a pipeline, respectively.

* * * * *